United States Patent [19]
Marino

[11] Patent Number: 5,910,936
[45] Date of Patent: Jun. 8, 1999

[54] MEASURING AND COMPENSATING FOR WARP IN AN OPTICAL RECORDING DISK

[75] Inventor: Philip F. Marino, Rochester, N.Y.

[73] Assignee: Eastman Kodak Company, Rochester, N.Y.

[21] Appl. No.: 08/852,987

[22] Filed: May 8, 1997

[51] Int. Cl.⁶ ..................................................... G11B 7/00
[52] U.S. Cl. ........................................ 369/58; 369/44.32
[58] Field of Search ............................. 369/44.32, 44.41, 369/54, 58, 44.14

[56] References Cited

U.S. PATENT DOCUMENTS

| | | | |
|---|---|---|---|
| 5,182,739 | 1/1993 | Kime et al. | 369/44.14 |
| 5,483,512 | 1/1996 | Yanagawa | 369/44.32 |
| 5,732,054 | 3/1998 | Marino et al. | 369/54 |
| 5,737,288 | 4/1998 | Marino et al. | 369/44.32 |
| 5,740,139 | 4/1998 | Marino et al. | 369/44.32 |

*Primary Examiner*—Thang V. Tran
*Attorney, Agent, or Firm*—Pamela R. Crocker

[57] ABSTRACT

Apparatus for measuring warp of an optical disk is disclosed. The apparatus includes an actuator having a base and a moveable lens holder, the lens holder being moveable in a vertical direction relative to the base. The apparatus further includes a structure for moving the actuator to selected positions relative to the surface of the disk and for measuring the vertical displacement of the disk surface relative to the actuator base at each of the selected positions, a structure for providing displacement signals corresponding to the vertical displacement of the disk surface at each of the selected positions, and a structure responsive to the displacement signals for computing a radial tilt matrix and a tangential tilt matrix of optical disk surface tilt values, the matrices representing the warp of the surface of the disk.

8 Claims, 3 Drawing Sheets

MEASURING AND COMPENSATING FOR WARP IN AN OPTICAL RECORDING DISK

FIELD OF INVENTION

The present invention relates to optical recording actuators, and in particular, to adjusting optical recording actuators to measure and compensate for warp of optical recording disks.

BACKGROUND OF THE INVENTION

Optical disk recording devices include an objective lens which focuses a laser light beam onto an optical disk while the disk is rotating. Focus and tracking actuators are typically used in optical disk recording devices to control the position of the objective lens relative to the rotating disk. Both focus and tracking of optical disks must continuously be maintained while the disks are recording. Focus is controlled by adjusting the distance between the objective lens and the disk surface. Tracking is controlled by correcting the radial position of the objective lens so that a single data track is read or written at a time. The motions of the actuator in the focus and tracking directions are conventionally controlled by a servo system.

Alignment of the optical axis of the objective lens to the optical disk must be maintained accurately for the system to function properly. Any tilt of the disk surface relative to the optical axis of the objective lens reduces overall system performance. A significant contributor to this undesirable tilt is the non-flatness, or warp, of the disk itself, which is hereinafter referred to as "disk warp." Disk warp is typically caused by shrinkage in the manufacturing process, and other causes such as material nonuniformity or imperfections. Disk warp generally results in tilt of the disk surface along each of two orthogonal directions. Radial tilt is rotation of the disk surface about an axis along the radius of the disk, and tangential tilt is rotation of the disk surface about an axis perpendicular to the radius of the disk within the nominal plane of the disk.

Typical prior art optical recording actuators cannot compensate for disk warp. The presence of disk warp limits the overall system performance, reduces recording quality, and requires higher laser power. In addition, the use of higher numerical aperture lenses is limited largely by the high tilt sensitivity associated with high numerical aperture lenses, which limits the recording information density on the optical disk.

SUMMARY OF THE INVENTION

Accordingly, it is an object of the present invention to provide an optical recording actuator which measures and compensates for disk warp.

This object is achieved by apparatus for measuring warp of a surface of an optical disk, comprising:

(a) an actuator including a base and a moveable lens holder, the lens holder being moveable in a vertical direction relative to the base;

(b) means for moving the actuator to selected positions relative to the surface of the disk and for measuring the vertical displacement of the disk surface relative to the actuator base at each of the selected positions;

(c) detector means for providing displacement signals corresponding to the vertical displacement of the disk surface at each of the selected positions; and (d) computation means responsive to the displacement signals for computing a radial tilt matrix and a tangential tilt matrix of optical disk surface tilt values, the matrices representing the warp of the surface of the disk.

ADVANTAGES

An advantage of the present invention is to provide an optical recording actuator which minimizes radial and tangential lens tilt error independent of the shape of the warped surface of the disk.

Another advantage of the present invention is to provide an optical recording actuator which permits the use of objective lenses having higher numerical apertures, and thus, permits higher data recording densities and higher recording speeds.

Yet another advantage of the present invention is to provide improved system performance by providing more effective use of the available laser power, better controlled spot size, shape, and quality of the laser light beam, and improved reading and writing on optical disks.

BRIEF DESCRIPTION OF THE DRAWINGS

To facilitate understanding, identical reference numerals have been used, where possible, to designate identical elements that are common to the figures.

DETAILED DESCRIPTION OF THE INVENTION

Figure 1:
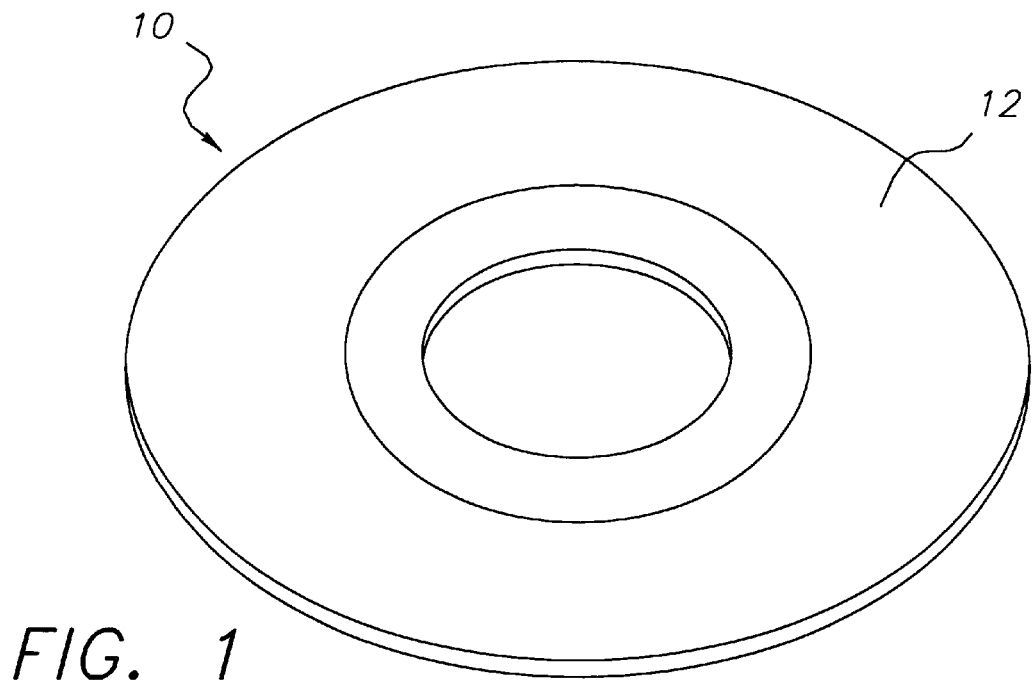
FIG. 1 is a perspective of a typical optical disk to be used in conjunction with an optical recording actuator in accordance with the present invention.

Referring to FIG. 1, a conventional optical recording disk 10 is shown. The disk 10 includes a recording layer 12 having a recording surface 14.

In order to adjust an optical recording actuator to compensate for warp of the disk 10 in accordance with the present invention, the actuator should include a base and a moveable lens holder having an objective lens. Preferably, the lens holder is moveable in at least three degrees of freedom of motion relative to the base so that tilt of the lens holder can be controlled in at least one direction of tilt (i.e., in-track or cross-track) in order to compensate for disk warp. The other two degrees of freedom of motion of the lens holder are used for focus and tracking control.

Figure 2:
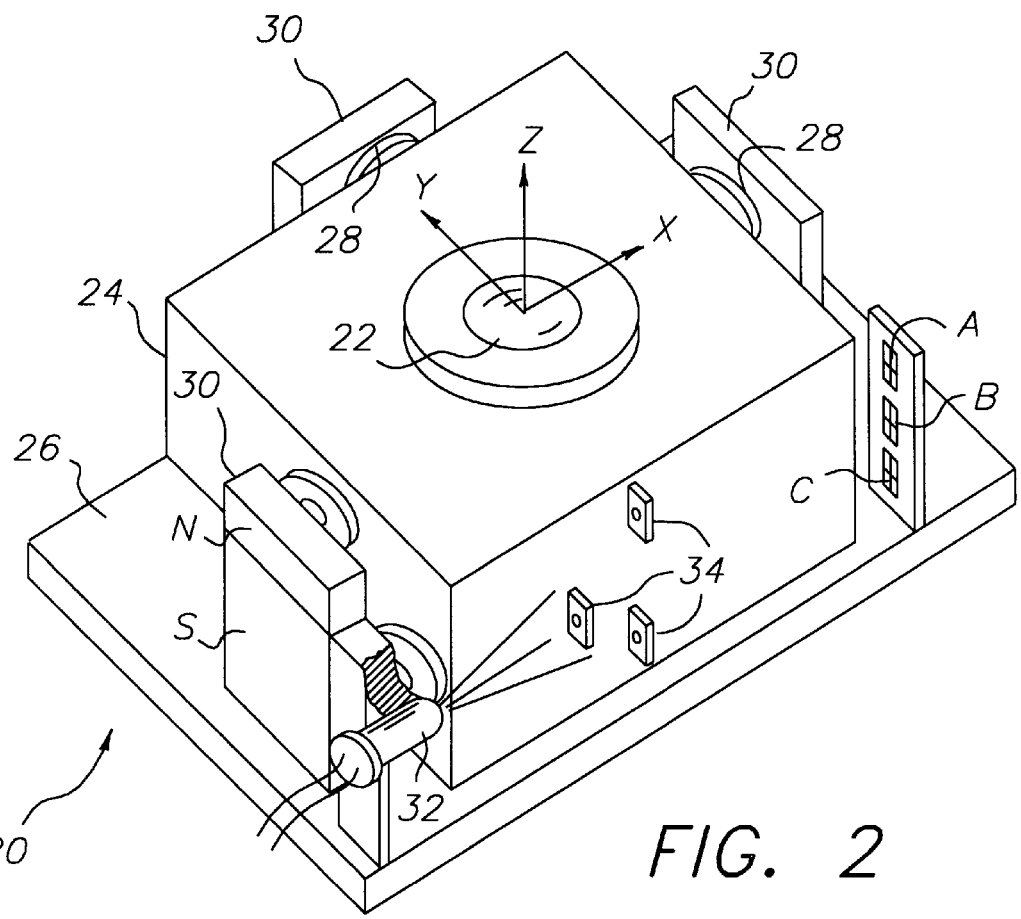
FIG. 2 is a schematic of an exemplary optical recording actuator which can be used in accordance with the present invention.

FIG. 2 shows an exemplary optical recording actuator 20 which can be used in accordance with the present invention to compensate for warp of the optical disk 10. The actuator 20, as shown in FIG. 2, is a magnetically suspended actuator as disclosed in commonly-assigned U.S. patent application Ser. No. 08/694,974, filed Aug. 9, 1996 by Marino et al., entitled "Magnetically Suspended Optical Recording Actuator," the disclosure of which is incorporated herein by reference. The magnetically suspended actuator 20 includes an objective lens 22 which focuses a laser light beam (not shown) onto the recording surface 14 of the disk 10 in a manner well known in the art. The objective lens 22 is fixed to a lens holder 24 by an adhesive or other fastening structure (not shown). The lens holder 24 is controllable in six degrees of freedom of motion relative to a base 26 of the actuator 20. For purposes of this disclosure, the term "six degrees of freedom of motion" means the translation of the lens holder 24 with respect to the base 26 in three orthogonal axes and the rotation of the device around these axes. Thus, tilt of the lens holder 24 can be controlled in three directions of tilt in order to compensate for warp of the disk 10 in accordance with the present invention. However, as previously mentioned, the magnetically suspended actuator 20 is exemplary, and warp of the disk 10 can be compensated for in accordance with the present invention with an actuator having control of a lens holder in only one direction of tilt. When measuring warp of the disk 10 in accordance with the present invention, an actuator having a lens holder moveable in a vertical direction relative to the actuator base is needed.

The magnetically suspended actuator 20 further includes six magnetic coils 28 which are fixed to the lens holder 24, only four of which are visible in FIG. 2. Three magnetic assemblies 30 which are fixed to the base 26 are shown to include three separate magnets which provide six poles, three of the poles are depicted in the planar magnetic coils 28 as being north, south, and north, respectively. On the opposite face of the magnets, there are three corresponding poles of south, north, and south.

The magnetically suspended actuator 20, as shown in FIG. 2, further includes a position sensing arrangement. Light from a light emitting diode (LED) 32 passes through three apertures 34 and illuminates three quad photosensitive detectors A, B, and C. The infonnation extracted from the quad photosensitive detectors A, B, and C is used to calculate the motion of the lens holder 24 and the objective lens 22 in all six degrees of freedom relative to the base 26. The quad photosensitive detectors A, B, and C are described in more detail in commonly-assigned U.S. patent Ser. No. 08/660,568, filed Jun. 7, 1996 by Marino et al., entitled "Position Sensing for an Optical Recording Actuator," the disclosure of which is incorporated herein by reference. In addition, as is well known to those skilled in the art, the actuator 20 is mounted on a movable carriage (not shown).

To adjust the actuator 20 to compensate for disk warp in accordance with the present invention, the disk 10 is inserted into a reader/writer (not shown), and is rotated using a conventional spindle motor (not shown). As the disk 10 is rotating, the actuator 20 is positioned at selected measurement positions relative to the surface 14 of the disk 10 by a conventional access mechanism (not shown). A tilt calibration is then performed on the disk 10, which includes measuring vertical displacement of the surface 14 of the disk 10 relative to the actuator base 26 at each of the selected measurement positions. The tilt calibration, which will be described in more detail below, results in the computation of a radial tilt matrix and a tangential tilt matrix representing the radial and tangential tilts, respectively, of the surface 14 of the disk 10 at each of the selected measurement positions, caused by the warp of the disk 10. The matrices are then used to adjust the lens holder 24 while reading or writing data on the disk 10 to compensate for the disk warp.

Figure 3:
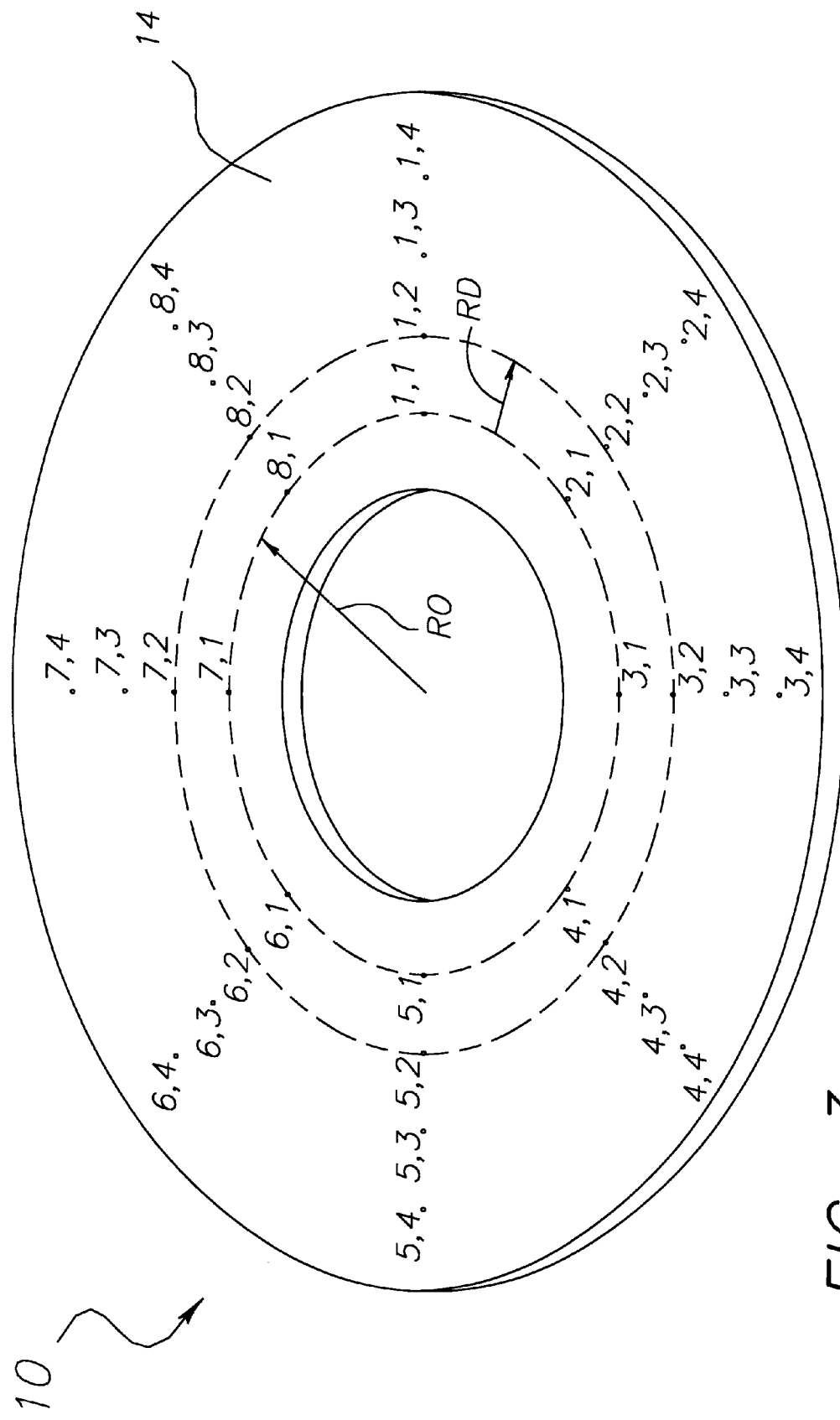
FIG. 3 is the optical disk of FIG. 1 showing the selected positions relative to the surface of the optical disk for which height values and tilt values are calculated.

Referring now to FIG. 3, the disk 10 of FIG. 1 is shown with the selected positions for measuring the vertical displacement of the surface 14 of the disk 10 relative to the base 26. Preferably, a total of thirty two selected measurement positions are identified on the surface 14 of the disk 10. The selected measurement positions are identified by the use of two indices, including 1-1 through 1-4, 2-1 through 2-4, 3-1 through 3-4, 4-1 through 4-4, 5-1 through 5-4, 6-1 through 6-4, 7-1 through 7-4, and 8-1 through 8-4. Preferably, the selected measurement positions are equally spaced both radially and angularly. However, it would be understood by those skilled in the art that either a smaller or greater number of selected measurement positions on the surface 14 of the disk 10 can be used, and these positions can be nonuniformly spaced. As shown in FIG. 3, the distance from the center of the disk 10 to the innermost circle of selected measurement positions is measured. This distance is designated as RO. In addition, the distance between adjacent circles of the selected measurement positions, designated as RD, is measured.

Figure 4:
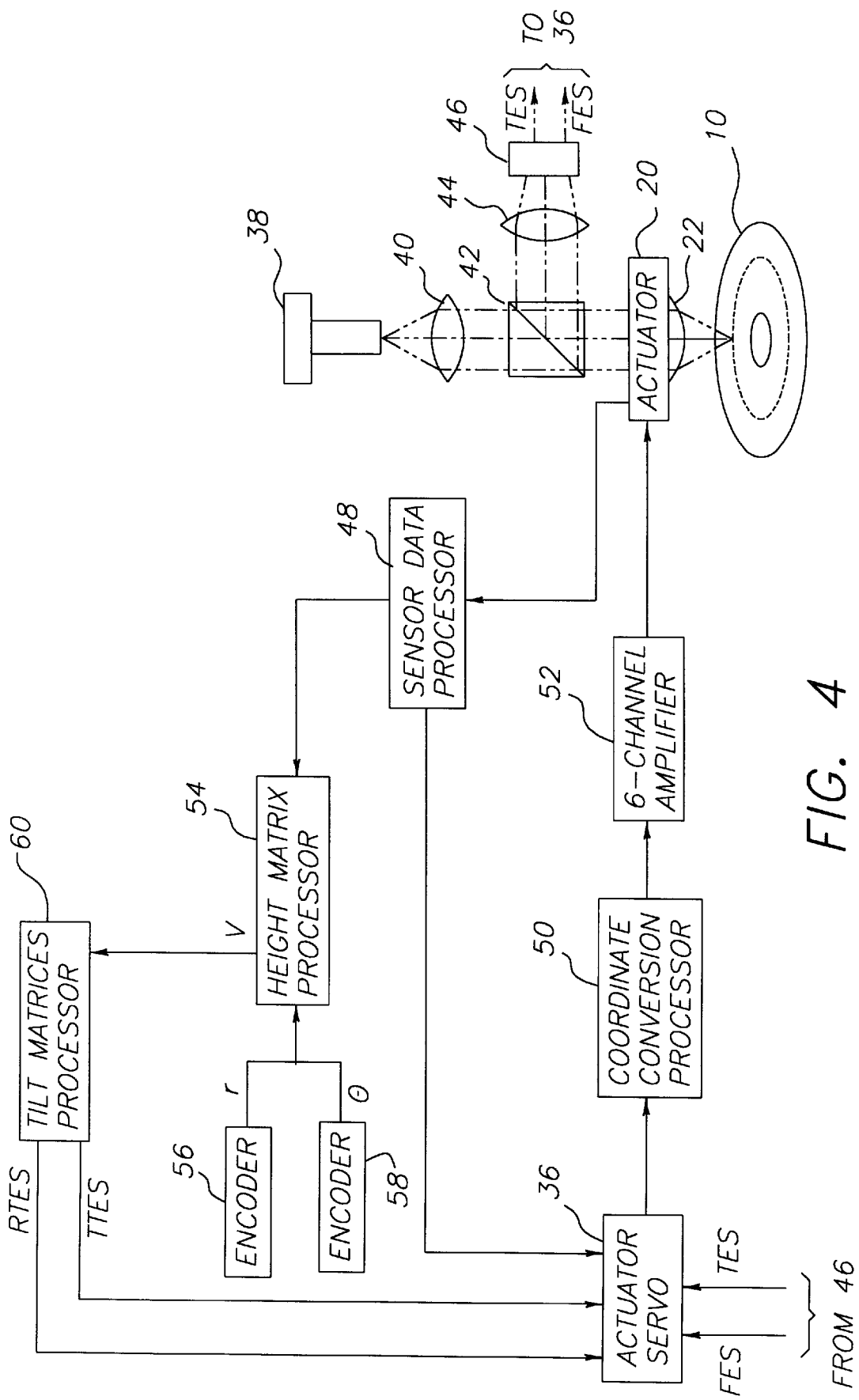
FIG. 4 is a block diagram of the tilt calibration in accordance with the present invention.

Referring now to FIG. 4, a block diagram of the tilt calibration is shown. It should be noted that during tilt calibration, the read/write laser (not shown) preferably should be powered at a low level so that the disk 10 is not affected by the laser spot. Preferably, the tilt calibration is performed once for each disk which is inserted into the reader/writer. In accordance with the present invention, the actuator 20 is positioned at the selected measurement positions relative to the surface 14 of the disk 10 so that vertical displacement of the surface 14 of the disk 10 relative to the base 26 is measured. The positioning of the actuator 20 and the carriage which mounts the actuator 20 can be controlled by the use of a conventional actuator servo 36. To control the position of the actuator 20 and the carriage, the actuator servo 36 utilizes conventional focus error signals (FES) and tracking error signals (TES) which are used to maintain the laser light beam in focus and on track, respectively. The TES and FES are generated in a manner well known in the art by transmitting a light beam from a laser 38 through a collimating lens 40 which collimates the light beam and directs the collimated light beam to a beamsplitter 42. The light beam passes through the beamsplitter 42 in a first direction and is focused by the objective lens 22 of the actuator 20 onto the disk 10. Light reflected from the disk 10 is recollimated by the objective lens 22 of the actuator 20 and is directed by the beamsplitter 42 in a second direction to a lens 44. The lens 44 focuses the collimated light beam onto a detector 46. The detector 46 generates the TES and FES from the reflected light beam in a manner well known to those skilled in the art.

In addition to using TES and FES to control the position of the actuator 20 and the carriage, the actuator servo 36 uses real time data from a sensor data processor 48, which digitizes the input signals from the quad photosensitive detectors A, B, and C (as shown in FIG. 2), and converts them into position signals representing all six degrees of freedom of motion of the lens holder 24 relative to the base 26. Three of the position signals generated by the sensor data processor 48 represent the rotation of the actuator 20 relative to the base 26. The other three position signals represent the vertical displacement, or z-position, of the surface 14 of the disk 10 relative to the base 26, and are referred to hereinafter as displacement signals. The sensor data processor 48 is disclosed in more detail in commonly-assigned U.S. patent application Ser. No. 08/660,568, filed by Marino et al. on Jun. 7, 1996, entitled "Position Sensing for an Optical Recording Actuator." In response to the three position signals and the three displacement signals, the actuator servo 36 then produces six command signals which represent the desired motion in the six degrees of freedom. The six command signals from the actuator servo 36 are converted by a coordinate conversion processor 50 into six signals which are amplified by a 6-channel amplifier 52 and used to control the position of the actuator 20. This arrangement is disclosed in more detail in commonly-assigned U.S. patent application Ser. No. 08/694,974, filed by Marino et al. on Aug. 9, 1996, entitled "Magnetically Suspended Optical Recording Actuator."

To compensate for disk warp, the displacement signals from the sensor data processor 48 at each of the selected measurement positions are sent to a height matrix processor 54. At the same time, data representing the disk radius, r, and angle, Θ, at each of the selected measurement positions are also sent to the height matrix processor 54. Such disk radius and angle data can be generated, for example, by two conventional encoders 56 and 58. The encoders 56 and 58 can be, for example, a linear optical encoder on the carriage, and a rotary encoder on the disk or disk spindle, respectively, both of which are well known to those skilled in the art. The height matrix processor 54 uses the displacement signals, and the disk radius and angle data at each of the selected measurement positions to generate a height value matrix, V. The height value matrix, V, is defined as follows:

$$V = \begin{bmatrix} V_{1,1} & V_{1,2} & V_{1,3} & V_{1,4} \\ V_{2,1} & V_{2,2} & V_{2,3} & V_{2,4} \\ V_{3,1} & V_{3,2} & V_{3,3} & V_{3,4} \\ V_{4,1} & V_{4,2} & V_{4,3} & V_{4,4} \\ V_{5,1} & V_{5,2} & V_{5,3} & V_{5,4} \\ V_{6,1} & V_{6,2} & V_{6,3} & V_{6,4} \\ V_{7,1} & V_{7,2} & V_{7,3} & V_{7,4} \\ V_{8,1} & V_{8,2} & V_{8,3} & V_{8,4} \end{bmatrix}$$

where the values designated as $V_{1,1}$ through $V_{8,4}$ represent the relative heights, or z-positions, of the surface 14 of the disk 10 relative to the base 26 at the selected measurement positions.

The height value matrix, V, is then sent to a tilt matrix processor 60, which computes a radial tilt matrix, R, and a tangential tilt matrix, T, for the disk 10 which represent the warp of the disk 10. During the computation of the radial tilt matrix, R, and the tangential tilt matrix, T, the tilt of the actuator 20 in both the radial and tangential directions are maintained at zero by the actuator servo 36.

The radial tilt matrix, R, is defined as follows:

$$R = \begin{bmatrix} R_{1,1} & R_{1,2} & R_{1,3} & R_{1,4} \\ R_{2,1} & R_{2,2} & R_{2,3} & R_{2,4} \\ R_{3,1} & R_{3,2} & R_{3,3} & R_{3,4} \\ R_{4,1} & R_{4,2} & R_{4,3} & R_{4,4} \\ R_{5,1} & R_{5,2} & R_{5,3} & R_{5,4} \\ R_{6,1} & R_{6,2} & R_{6,3} & R_{6,4} \\ R_{7,1} & R_{7,2} & R_{7,3} & R_{7,4} \\ R_{8,1} & R_{8,2} & R_{8,3} & R_{8,4} \end{bmatrix}$$

The values designated as $R_{1,1}$ through $R_{8,4}$ represent the radial tilt of the disk 10 at the selected measurement positions relative to the surface 14 of the disk 10. These values are calculated by the tilt matrix processor 60 based on the height value matrix, V, using the following matrix equations:

$$\text{For } i = 1: \quad R_{i,j} = \frac{V_{2,j} - V_{8,j}}{\frac{\Pi}{2}[RO + (j-1)(RD)]}$$

$$\text{For } 1 < i < 8: \quad R_{i,j} = \frac{V_{i+1,j} - V_{i-1,j}}{\frac{\Pi}{2}[RO + (j-1)(RD)]}$$

$$\text{For } i = 8: \quad R_{i,j} = \frac{V_{1,j} - V_{i-7,j}}{\frac{\Pi}{2}[RO + (j-1)(RD)]}$$

where i is the first index representing the selected measurement position on the surface 14 of the disk 10, j is the second index representing the selected measurement position, $V_{ij}$ are the height values from the height value matrix V, RO is the distance from the center of the disk 10 to the innermost circle of the selected measurement position, and RD is the distance between adjacent circles of the selected measurement position.

The tangential tilt matrix, T, is defined as follows:

$$T = \begin{bmatrix} T_{1,1} & T_{1,2} & T_{1,3} & T_{1,4} \\ T_{2,1} & T_{2,2} & T_{2,3} & T_{2,4} \\ T_{3,1} & T_{3,2} & T_{3,3} & T_{3,4} \\ T_{4,1} & T_{4,2} & T_{4,3} & T_{4,4} \\ T_{5,1} & T_{5,2} & T_{5,3} & T_{5,4} \\ T_{6,1} & T_{6,2} & T_{6,3} & T_{6,4} \\ T_{7,1} & T_{7,2} & T_{7,3} & T_{7,4} \\ T_{8,1} & T_{8,2} & T_{8,3} & T_{8,4} \end{bmatrix}$$

The values designated as $T_{1,1}$ through $T_{8,4}$ represent the tangential tilt of the disk 10 at the selected measurement positions relative to the surface 14 of the disk 10. These values are calculated by the tilt matrix processor 60 based on the height value matrix, V, using the following matrix equations:

$$\text{For } j = 1: \quad T_{i,j} = \frac{V_{i,1} - V_{i,2}}{RD}$$

$$\text{For } 1 < j < 4: \quad T_{i,j} = \frac{V_{i,j-1} - V_{i,j+1}}{2RD}$$

$$\text{For } j = 4: \quad T_{i,j} = \frac{V_{i,3} - V_{i,4}}{RD}$$

where i is the first index representing the selected measurement position on the surface 14 of the disk 10, j is the second index representing the selected measurement position, $V_{ij}$ are the height values from the height value matrix V, and RD is the distance between adjacent circles of the selected measurement position. Although the radial tilt matrix, R, and the tangential tilt matrix, T, are computed using a slope calculation method, it would be understood by those skilled in the art that other methods could be used, such as a curve fitting method.

To compensate for disk warp during reading or writing data on the disk 10, the tilt matrix processor 60 continually calculates the desired tilts of the magnetically suspended actuator 20 based on the radial tilt matrix, R, the tangential tilt matrix, T, and the disk radius and angle data. Preferably, the desired tilts are calculated by selecting the tilt values from the radial tilt matrix, R, and the tangential tilt matrix, T, that correspond to a particular measurement position relative to the surface 14 of the disk 10 which is closest to the real time location of the read and write spot on the disk 10. Alternatively, the data in the radial tilt matrix, R, and the tangential tilt matrix, T, can be used to calculate the desired tilt values based on an interpolation method. The tilt matrix processor 60 generates a radial tilt error signal (RTES) and a tangential tilt error signal (TTES) based on the calculated desired tilt values. The actuator servo 36 adjusts the tilt of the lens holder 24 during reading or writing data on the disk 10 in response to the RTES and TTES to compensate for warp of the disk 10. The lens holder 24 is adjusted in all six degrees of freedom of motion by the actuator servo 36 through the coordinate conversion processor 50 and the 6-channel amplifier 52, as previously described. Compensation for warp of the disk 10 in accordance with the present invention results in substantially improved reading or writing of the data, which substantially reduces phase margin loss due to disk tilt, permitting the use of higher aperture lenses, and therefore, permitting smaller spot sizes and higher data densities.

It would be understood by those skilled in the art that disk warp can be compensated for in a manner other than adjusting the tilt of the lens holder 24 to provide substantially similar improved performance, such as by adjusting the laser power during reading or writing data on the disk 10 or by modifying the signal processing. In addition, if the disk 10 is severely warped, the disk 10 can be rotated at a slower speed rather than rejecting the disk entirely.

The invention has been described with reference to a preferred embodiment. However, it will be appreciated that variations and modifications can be effected by a person of ordinary skill in the art without departing from the scope of the invention.

PARTS LIST
A,B,C quad photosensitive detector
10 disk
12 recording layer
14 recording surface
20 optical recording actuator
22 objective lens
24 lens holder
26 base
28 magnetic coil
30 magnetic assembly
32 light emitting diode
34 aperture
36 actuator servo
38 laser
40 collimating lens
42 beamsplitter
44 lens
46 detector
48 sensor data processor
50 coordinate conversion processor
52 6-channel amplifier
54 height value matrix
56 encoder
58 encoder
60 tilt matrix processor

What is claimed is:

1. Apparatus for measuring warp of a surface of an optical disk, comprising:
   (a) an actuator including a base and a moveable lens holder, the lens holder being moveable in a vertical direction relative to the base;
   (b) means for moving the actuator to selected positions relative to the surface of the disk and for measuring the vertical displacement of the disk surface relative to the actuator base at each of the selected positions;
   (c) detector means for providing displacement signals corresponding to the vertical displacement of the disk surface at each of the selected positions; and
   (d) computation means responsive to the displacement signals for computing a radial tilt matrix and a tangential tilt matrix of optical disk surface tilt values, the matrices representing the warp of the surface of the disk.

2. The apparatus of claim 1 wherein the radial tilt matrix and tangential tilt matrix computation means includes:
   (i) means for determining a disk radius value and a disk angle value at each of the selected measurement positions relative to the surface of the disk;
   (ii) means for computing a height value matrix as a function of the vertical displacement of the disk surface relative to the actuator base at each of the selected measurement positions; and
   (iii) means responsive to the height value matrix, the disk radius values, and the disk angle values for computing the radial tilt matrix and the tangential tilt matrix.

3. Apparatus for adjusting tilt of an optical recording actuator to compensate for warp of an optical disk, the actuator including a base and a moveable lens holder, the lens holder being moveable in at least three degrees of freedom of motion relative to the base, comprising:
   (a) means for moving the actuator to selected positions relative to a surface of the disk and for measuring vertical displacement of the disk surface relative to the actuator base at each of the selected positions;
   (b) detector means for providing displacement signals corresponding to the vertical displacement of the disk surface at each of the selected positions;
   (c) computation means responsive to the displacement signals for computing a radial tilt matrix and a tangential tilt matrix of optical disk surface tilt values, the matrices representing the radial and tangential tilt of the surface of the disk, respectively, at each of the selected positions; and
   (d) means responsive to the radial tilt matrix and the tangential tilt matrix for adjusting the tilt of the actuator in at least one degree of freedom of motion during reading or writing on the disk, thereby compensating for disk warp.

4. The apparatus of claim 3 wherein the radial tilt matrix and tangential tilt matrix computation means includes:
   (i) means for determining a disk radius value and a disk angle value at each of the selected measurement positions relative to the surface of the disk;
   (ii) means for computing a height value matrix as a function of the vertical displacement of the disk surface relative to the actuator base at each of the selected measurement positions; and
   (iii) means responsive to the height value matrix, the disk radius values, and the disk angle values for computing the radial tilt matrix and the tangential tilt matrix.

5. The apparatus of claim 3 wherein the selected measurement positions are equally spaced both radially and angularly.

6. A method for adjusting tilt of an optical recording actuator to compensate for warp of an optical disk, the actuator including a base and a moveable lens holder having an objective lens, the lens holder being moveable in at least three degrees of freedom of motion relative to the base, comprising the steps of:
   (a) measuring vertical displacement of the disk surface relative to the actuator base at selected positions relative to the surface of the disk;
   (b) providing displacement signals corresponding to the vertical displacement of the disk surface at each of the selected positions;

(c) computing a radial tilt matrix and a tangential tilt matrix of optical disk surface tilt values in response to the displacement signals, the matrices representing the radial and tangential tilt of the surface of the disk, respectively, at each of the selected positions; and (d) adjusting the tilt of the actuator in at least one degree of freedom of motion during reading or writing on the disk in response to the radial tilt matrix and the tangential tilt matrix, thereby compensating for disk warp.

7. The method of claim 6 wherein the radial tilt matrix and tangential tilt matrix computing step includes:

(i) determining a disk radius value and a disk angle value at each of the selected measurement positions relative to the surface of the disk;

(ii) computing a height value matrix as a function of the vertical displacement of the disk surface relative to the actuator base at each of the selected measurement positions; and (iii) computing the radial tilt matrix and the tangential tilt matrix in response to the height value matrix, the disk radius values, and the disk angle values.

8. The method of claim 6 wherein the selected measurement positions are equally spaced both radially and angularly.

* * * * *